United States Patent
Chou et al.

(10) Patent No.: US 7,896,253 B2
(45) Date of Patent: Mar. 1, 2011

(54) METHOD FOR AUTOMATICALLY RECTIFYING BUSINESS CARD PRESENTATION ANGLE

(75) Inventors: Hong-Long Chou, Taipei (TW); Shih-Yuan Peng, Banciao (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 12/344,118

(22) Filed: Dec. 24, 2008

(65) Prior Publication Data

US 2009/0166441 A1 Jul. 2, 2009

(30) Foreign Application Priority Data

Dec. 28, 2007 (TW) .............................. 96150970 A

(51) Int. Cl.
*G06K 9/40* (2006.01)
*G06K 19/06* (2006.01)
(52) U.S. Cl. .................. 235/494; 382/254; 382/276
(58) Field of Classification Search ................ 382/254, 382/276; 235/494
See application file for complete search history.

(56) References Cited

U.S. PATENT DOCUMENTS

| | | | | |
|---|---|---|---|---|
| 5,054,098 A | * | 10/1991 | Lee | 382/289 |
| 5,854,854 A | * | 12/1998 | Cullen et al. | 382/176 |
| 2004/0240737 A1 | * | 12/2004 | Lim et al. | 382/182 |

* cited by examiner

*Primary Examiner*—Michael G Lee
*Assistant Examiner*—Laura Gudorf
(74) *Attorney, Agent, or Firm*—Rabin & Berdo, P.C.

(57) ABSTRACT

A method for automatically rectifying business card presentation angle is described. The method is applicable to a mobile electronic device to automatically rectify a presentation angle of a shot business card image. Firstly, maintain character pixels of the shot business card image, and divide the character pixels into character groups by determining whether the pixel pitch is larger than a predetermined value. Next, obtain a first axis and a second axis of the character groups. After that, calculate an included angle formed between the first axis and the second axis, and adjust the oblique character groups through angles obtained for correction. Then, adjust aspect ratios of all the character groups after angle correction according to appropriate character aspect ratios, to make the displayed font seem normal. Finally, generate a corrected business card image according to the character groups after correction.

11 Claims, 6 Drawing Sheets

Technology Corporation Ltd.

810 —

Senior Engineer   Hsinchu Science Park
Argorithmic      Tex：(03)555-0000
ASIC RD          Fax：(03)555-8888
ASIC Department  VAT number：12345678
                 E-mail：david@david.com.tw 820  Technology Corporation Ltd.

Senior Engineer   Hsinchu Science Park
Argorithmic      Tex：(03)555-0000
ASIC RD          Fax：(03)555-8888
ASIC Department  VAT number：12345678
                 E-mail：david@david.com.tw

METHOD FOR AUTOMATICALLY RECTIFYING BUSINESS CARD PRESENTATION ANGLE

CROSS-REFERENCE TO RELATED APPLICATIONS

This non-provisional application claims priority under 35 U.S.C. §119(a) on Patent Application No(s). 096150970 filed in Taiwan, R.O.C. on Dec. 28, 2007 the entire contents of which are hereby incorporated by reference.

BACKGROUND OF THE INVENTION

1. Field of the Invention

The present invention relates to an image processing method. More particularly, the present invention relates to a method for automatically rectifying business card presentation angle.

2. Related Art

In social communication occasions, people often use business cards to express their personal information and develop interpersonal relationships by exchanging the business cards. With the expansion of social relationships, the business cards are increasingly accumulated, and thus the business card management becomes quite important. In the past, the business card management is usually collecting and organizing the business cards into booklets. However, in order to look up personal information of a contact person, the business card of the contact person still has to be searched for in the piles and booklets of business cards, which is against the requirements of high-efficiency mobile commerce. With the coming of the electronic age, in most circumstances, data on each business card is built into a database through a computer, and the business card data of a wanted contact person can be easily found by keying in the name of the contact person. However, it is a bit slow to key the business card data one by one into the computer database. Thereby, a business card recognition (BCR) technique is put forward to enhance the business card management efficiency, in which business cards are scanned by an optical recognizer, or shot by an optical lens to obtain card images, and then the information on the business cards is captured and automatically input into a computer database.

Currently, many mobile electronic devices, such as mobile phones and personal digital assistants, all apply the BCR technique. Business cards are shot by a lens module built in a mobile electronic device to obtain card images, and then the information on the business cards is analyzed to construct a mobile business card database in the mobile electronic device. However, the BCR technique applied in the mobile devices often leads to recognition failure or error due to the shooting angle. For example, when a hand-held mobile electronic device is used to shoot a business card, a departure of the shooting angle may occur at the moment the shoot button is pressed. As a result, the presentation angle of the shot card image is oblique and is hard to recognize. In some mobile devices, a plurality of border lines is provided in the viewing window or display screen for the user to correct the shooting angle of the business cards. The mobile electronic device shoots only after the shooting angle is corrected into an acceptable range of the BCR system. However, such method still cannot eliminate the departure of the shooting angle occurring at the moment the shoot button is pressed. Moreover, in some mobile devices, a user interface is provided for the user to circumscribe the part of the shot business card image to be corrected after shooting. Such correction has to be performed in certain steps. The elders or those unfamiliar with the operation cannot easily carry out the business card recognition. In addition, for some mobile devices, the placing angle and position of a business card are determined according to the color difference between the business card and the background, and the shot image of the business card is automatically corrected, so as to improve the accuracy of capturing the information on the image of the business card. However, it is difficult for the elders or those unfamiliar with the operation to get accustomed to the manner of providing the user with border lines to assist the correction of the shooting angle or with a human-machine interface to select the recognition range. Besides, the manner of automatically correcting the image angle through the color contrast between the business card and the background may not successfully rectify the business card image as the background is too white, thus resulting in the failure of business card recognition.

SUMMARY OF THE INVENTION

In view of the above problems that when performing a business card recognition with a mobile electronic device, the shooting angle may affect the accuracy of recognition and the correction process is too complicated, the present invention is directed to a method for automatically rectifying business card presentation angle. Firstly, two axes are automatically taken out according to the arrangement sequence of the characters and the space there-between on a business card. Then, the font of the characters in the business card image is adjusted and rectified through the axes, such that the characters may not be oblique or distorted, thereby enhancing the accuracy of the business card recognition.

In order to achieve the above objective, the method for automatically rectifying business card presentation angle provided by the present invention is applicable to a mobile electronic device, so as to automatically rectify a presentation angle of a shot business card image. The method includes the following steps: first, maintaining a plurality of character pixels in the business card image; next, taking out a plurality of character groups from the character pixels; then, circling the character groups with a border-defining block, and drawing a corresponding first axis according to the positions of the character pixels arranged side by side in the character groups; afterward, drawing a corresponding second axis according to the position of a first character pixel in each row of the character pixels in the character groups; then, calculating an included angle formed between the first axis and the second axis corresponding to the character groups, and adjusting the character groups according to the included angle; and finally, when the included angle is larger than a predetermined angle, adjusting the length and width of the character groups according to a character aspect ratio, and generating a corrected business card image.

In the method for automatically rectifying business card presentation angle according to a preferred embodiment of the present invention, the character pixels are pixels in the business card image with a brightness greater than that of a predetermined image.

In the method for automatically rectifying business card presentation angle according to a preferred embodiment of the present invention, the step of taking out the plurality of character groups includes: first, calculating a pitch between any two adjacent character pixels; next, when the pitch is determined to be smaller than a predetermined distance, arranging the adjacent character pixels into the same character group; and when the pitch is determined to be larger than the predetermined distance, arranging the adjacent character pixels into different character groups.

In the method for automatically rectifying business card presentation angle according to a preferred embodiment of the present invention, the range of the border-defining block is set to be the range of each column of the character pixels in the character groups plus a line-height.

In the method for automatically rectifying business card presentation angle according to a preferred embodiment of the present invention, the step of adjusting the character groups according to the included angle includes: first, rotating the character groups, to make the second axis of the character groups horizontal; next, calculating the included angle formed between the first axis and the second axis of the character groups; then, calculating a rotation angle corresponding to the included angle; and finally, rectifying the obliqueness of the corresponding character group according to the rotation angle, so as to make the first axis perpendicular to the second axis of the character group.

The method for automatically rectifying business card presentation angle according to a preferred embodiment of the present invention further includes determining the font according to one of the character pixels, and setting the character aspect ratio according to the font.

The method for automatically rectifying business card presentation angle according to a preferred embodiment of the present invention further includes adjusting the length and width of the corrected business card image according to a predetermined business card aspect ratio.

Therefore, in the method for automatically rectifying business card presentation angle provided by the present invention, multiple groups of characters are divided according to the space between the characters on the business card. Next, a first axis and a second axis are set according to the positions of the columns and rows of the characters in the character groups. After that, the obliqueness of the character groups is determined through an included angle formed between the first axis and the second axis. Thereby, the character groups are rotated to be corrected and the aspect ratio of the character groups is also adjusted, so as to generate a business card image with a correct font.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objective and method of the present invention are described in detail below with preferred embodiments, and the concept of the present invention may also be applied to other scopes. The embodiments below are only used to illustrate the objective and method of the present invention, instead of limiting the scope of the same.

Figure 1:
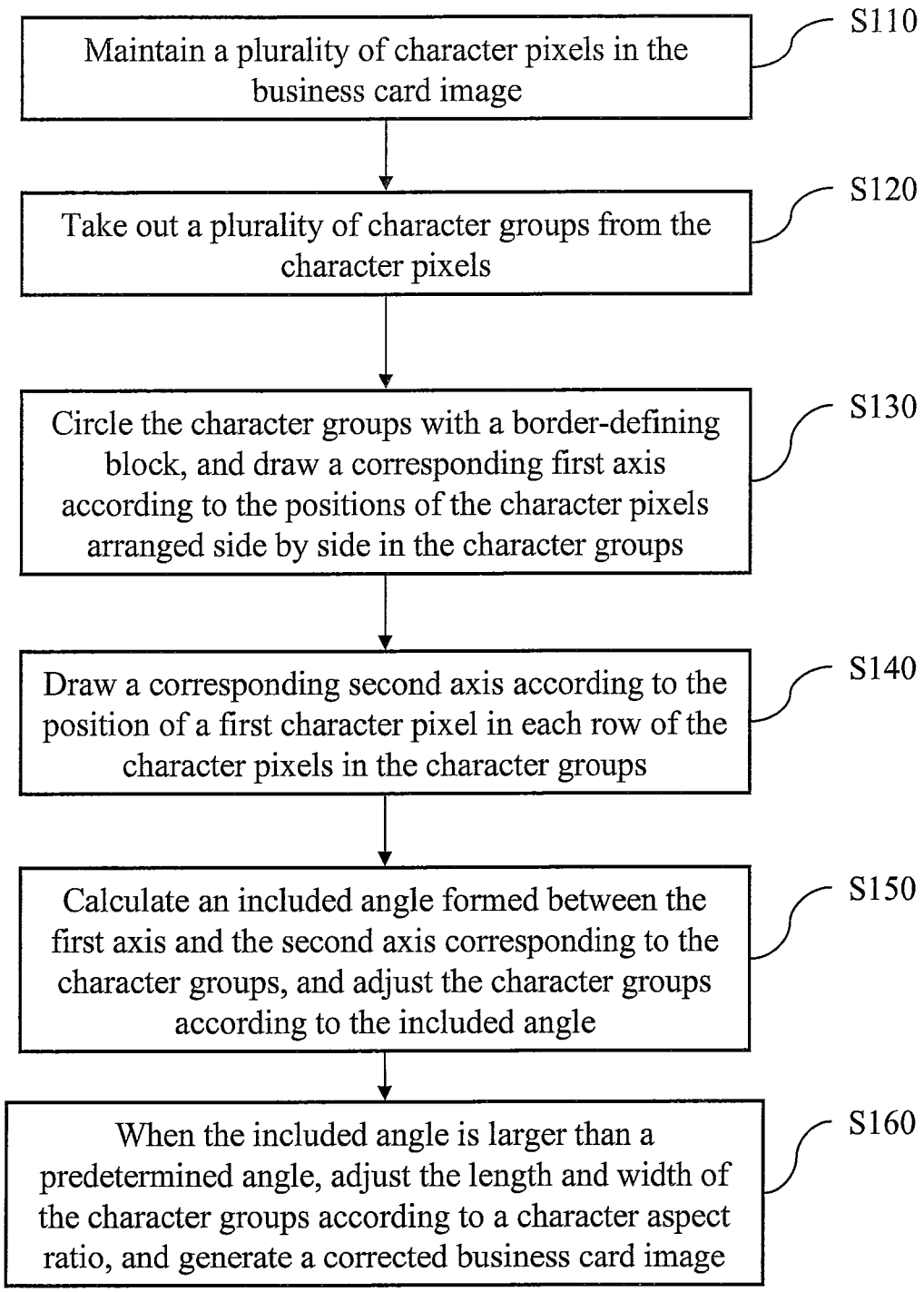
FIG. 1 is a flow chart of a method for automatically rectifying business card presentation angle according to a preferred embodiment of the present invention.

FIG. 1 is a flow chart of a method for automatically rectifying business card presentation angle according to a preferred embodiment of the present invention. Referring to FIG. 1, the method for automatically rectifying business card presentation angle of this embodiment is performed by a mobile electronic device. The mobile electronic device has a digital camera lens disposed therein. After shooting a business card, the mobile electronic device performs the method for automatically rectifying business card presentation angle to automatically rectify a presentation angle of a business card image, such that a business card recognition system carries out the business card recognition. The method includes the following steps: first, maintaining a plurality of character pixels in the business card image (Step S110); next, taking out a plurality of character groups from the character pixels (Step S120); then, circling the character groups with a border-defining block, and drawing a corresponding first axis according to the positions of the character pixels arranged side by side in the character groups (Step S130); afterward, drawing a corresponding second axis according to the position of a first character pixel in each row of the character pixels in the character groups (Step S140); then, calculating an included angle formed between the first axis and the second axis corresponding to the character groups, and adjusting the character groups according to the included angle (Step S150); and finally, when the included angle is larger than a predetermined angle, adjusting the length and width of the character groups according to a character aspect ratio, and generating a corrected business card image (Step S160).

Examples will be given below for illustrating the process of the present invention in detail.

Figure 2:
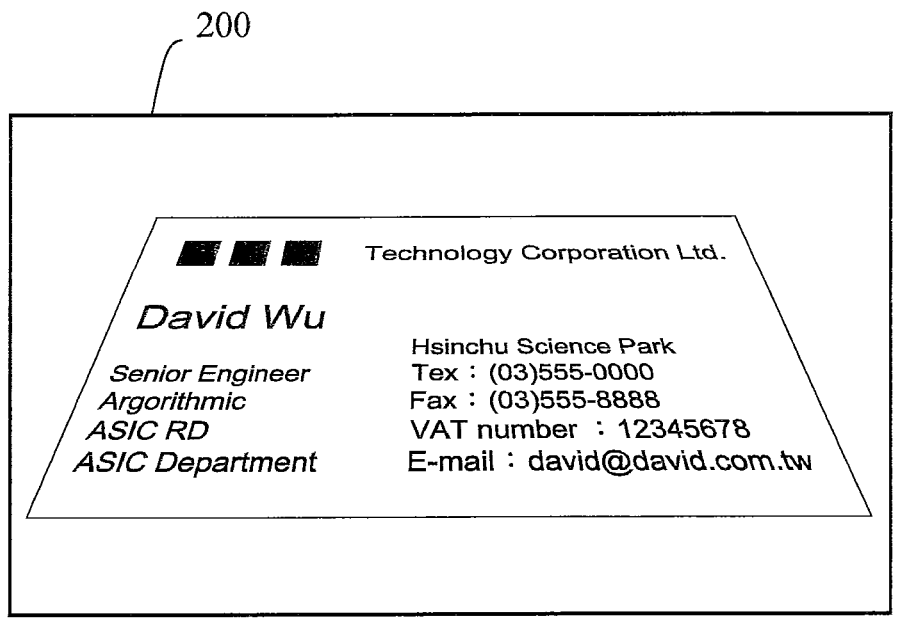
FIG. 2 is a schematic view of a business card image before processing according to a preferred embodiment of the present invention.

FIG. 2 is a schematic view of a business card image before processing according to a preferred embodiment of the present invention. Referring to FIG. 2, a mobile electronic device, such as a mobile phone or personal digital assistant, actuates a digital camera lens to shoot a business card placed on a table, so as to obtain a business card image 200 before processing. It can be seen from FIG. 2 that, due to the problem in the shooting angle, the characters in the business card image 200 before processing are distorted and hard to recognize.

Figure 3:
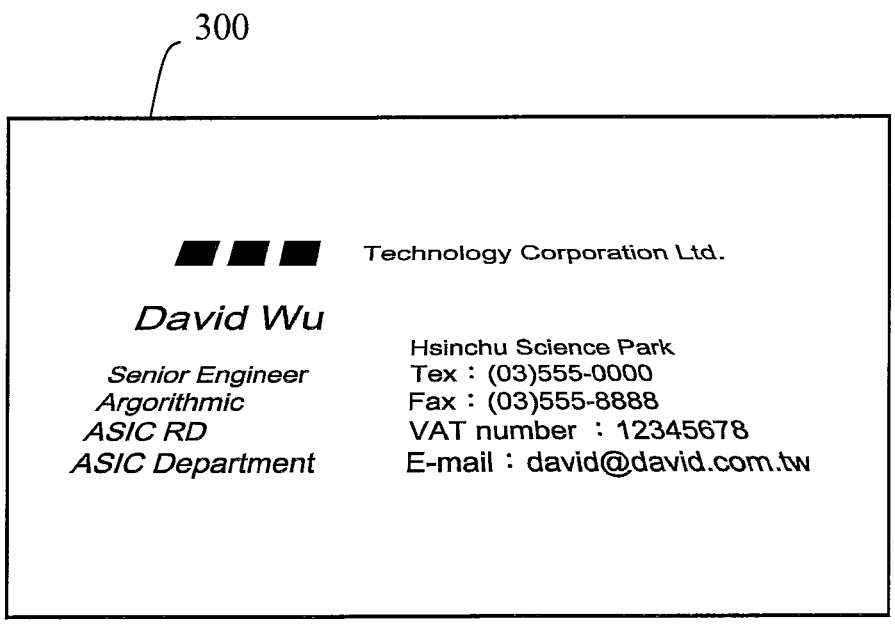
FIG. 3 is a schematic view of a business card image with character pixels maintained therein before processing according to a preferred embodiment of the present invention.

FIG. 3 is a schematic view of a business card image with character pixels maintained therein before processing according to a preferred embodiment of the present invention. Referring to FIG. 3, as the pixels recorded with font information in the business card image generally have a greater image brightness, it can be determined whether a pixel is a part of the characters according to the image brightness in the business card image. After inputting a business card image before processing, it is determined whether the brightness of all the pixels in the business card image is greater than that of a predetermined image. If the brightness of a pixel in the business card image is greater than that of the predetermined image, the pixel is considered as a character pixel. After comparing the brightness of all the pixels in the business card image, character pixels 300 maintained in the business card image are obtained.

Figure 4:
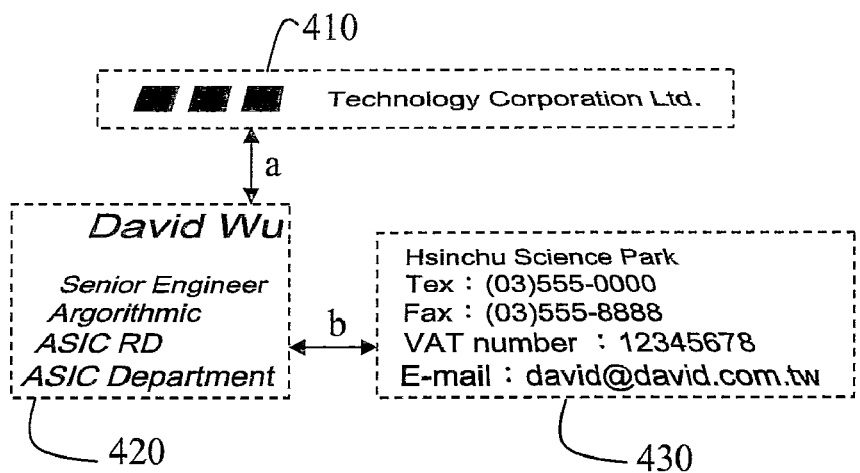
FIG. 4 is a schematic view showing the division of character groups according to a preferred embodiment of the present invention.

FIG. 4 is a schematic view showing the division of character groups according to a preferred embodiment of the present invention. Referring to FIG. 4, after finding all the character pixels in the business card, the character pixels are grouped. Generally, the business card is designed to have several blocks with multiple rows of characters. For example, name, title, department are arranged in the same block and shown in italic, and company address and contact information are arranged in another block and shown in reverse oblique. The groups generally have a large space in-between to facilitate the recognition of the business card information. The plurality of character pixels in the business card image is arranged into several character groups based on the characteristic that different character groups have a large space in-between. The character groups are taken out by the following steps.

Firstly, a pitch between any two adjacent character pixels is calculated. Next, when the pitch is determined to be smaller than or equal to a predetermined distance, the adjacent character pixels are arranged into the same character group. For example, in a character group 410, it can be found out that the pitches between the character pixels are all smaller than the predetermined distance, and thus the character pixels are determined to be in the same character group. Similarly, the rest of the character pixels can also be divided into character groups 420, 430. When the pitch is determined to be larger than the predetermined distance, the adjacent character pixels are arranged into different character groups. For example, the pitch a between a character pixel in the character group 410 and an adjacent character pixel in the character group 420 is larger than the predetermined distance, such that the two character pixels are determined to be in different character groups. Further, the pitch b between a character pixel in the character group 420 and an adjacent character pixel in the character group 430 is larger than the predetermined distance, such that the two character pixels are determined to be in different character groups.

Figure 5:
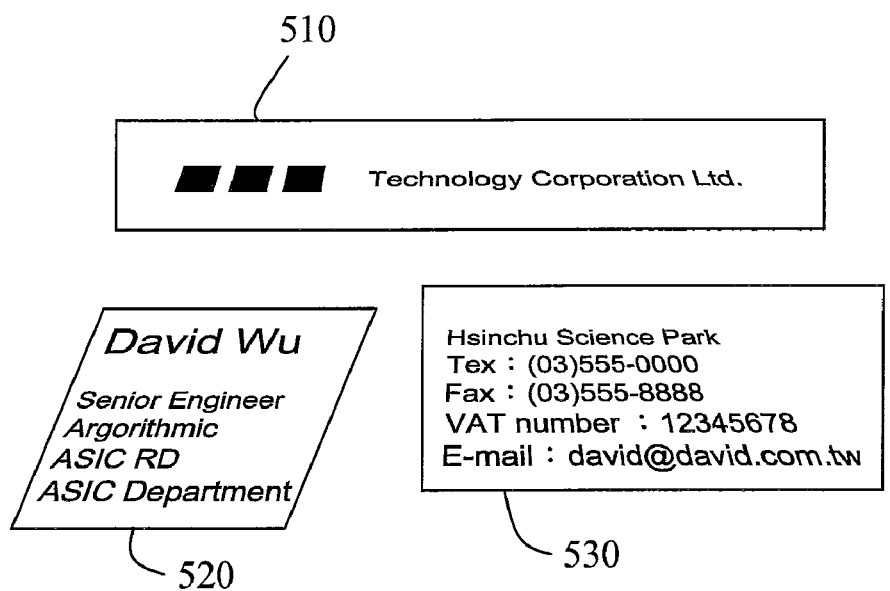
FIG. 5 is a schematic view showing the division of character groups with a border-defining block according to a preferred embodiment of the present invention.

FIG. 5 is a schematic view showing the division of character groups with a border-defining block according to a preferred embodiment of the present invention. Referring to FIG. 5, after arranging the character groups, the character groups are further divided through a border-defining block. The so-called border-defining block is, for example, a frame for circumscribing the character group and defining the range of the character group. Generally, the range of the border-defining block is set to be, but not limited to, the range of each column of the character pixels in the character groups plus a line-height. Referring to FIGS. 4 and 5 again, border-defining blocks 510, 520, and 530 are used to define the character groups 410, 420, and 430 respectively.

Figure 6:
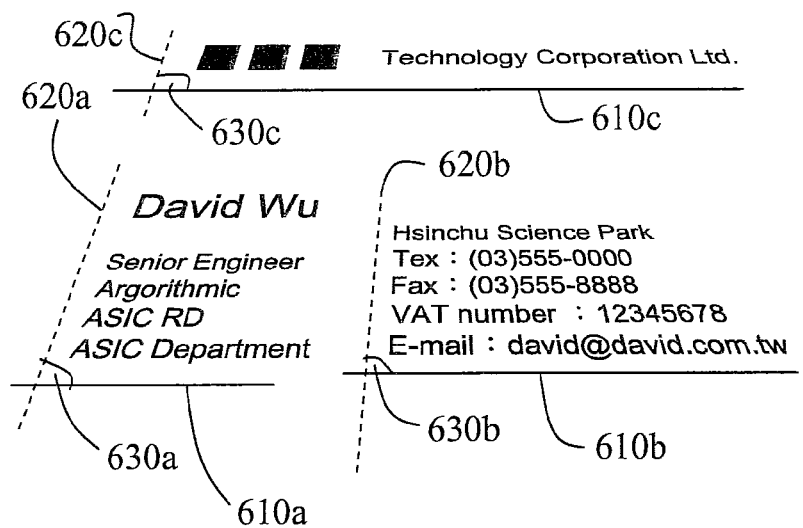
FIG. 6 is a schematic view showing the definition of obliqueness of each character group according to a preferred embodiment of the present invention.

FIG. 6 is a schematic view showing the definition of obliqueness of each character group according to a preferred embodiment of the present invention. Referring to FIG. 6, after defining the range of each character group, a first axis is drawn according to the character pixels horizontally arranged side by side (in parallel) in the character group. Then, a second axis is drawn according to a first character pixel in each row of the character pixels in the character groups. Referring to FIGS. 4 and 6, according to the positions of the character pixels arranged in parallel in the character group 420, a first axis 610a in FIG. 6 is drawn, and according to the position of a first character pixel in each row of the character pixels in the character group 420, a second axis 620a in FIG. 6 is drawn. Similarly, a first axis 610c and a second axis 620c of the character group 410 are drawn, and a first axis 610b and a second axis 620b of the character group 430 are drawn. After the first axis and the second axis of each character group are drawn, an included angle formed between the first axis and the second axis is further calculated, for example, calculating an included angle 630c in the character group 410, an included angle 630a in the character group 420, and an included angle 630b in the character group 430.

Figure 7:
FIG. 7 is a schematic view showing the rectification of character groups in a business card image according to a preferred embodiment of the present invention.

FIG. 7 is a schematic view showing the rectification of character groups in a business card image according to a preferred embodiment of the present invention. Referring to FIG. 7, after calculating the included angle formed between the first axis and the second axis of each character group, it can be figured out whether the character groups are oblique as well as the oblique angles, and the angles of the character groups are automatically adjusted to correct the font of the character pixels in the character groups. The step of adjusting the character groups according to the included angle includes: firstly, rotating the character groups, to make the second axis of the character groups horizontal; next, calculating the included angle formed between the first axis and the second axis of the character groups; then, calculating a rotation angle corresponding to the included angle; and finally, rectifying the obliqueness of the corresponding character group according to the rotation angle, so as to make the first axis perpendicular to the second axis of the character group. Through the above procedures, the font of the character pixels (i.e., the font of the character groups) in the business card is corrected, as shown in FIG. 7.

Figure 8A:
FIG. 8A is a schematic view showing character pixels before the adjustment of aspect ratio according to a preferred embodiment of the present invention.
Figure 8A:
Figure 8B:
FIG. 8B is a schematic view showing character pixels after the adjustment of aspect ratio according to a preferred embodiment of the present invention.
Figure 8B:

FIG. 8A is a schematic view showing character pixels before the adjustment of aspect ratio according to a preferred embodiment of the present invention, and FIG. 8B is a schematic view showing character pixels after the adjustment of aspect ratio according to a preferred embodiment of the present invention. Referring to FIGS. 8A and 8B in sequence, after correcting all the character groups in the business card image, although the font of the character pixels in the business card image is correct, the aspect ratio of the character pixels may be excessively wide or narrow, which still results in a failure of the business card recognition. Thereby, the aspect ratio of the character pixels in the character groups has to be further adjusted, such that the font of the character pixels may not look excessively wide or narrow. For example, a character pixel 810 in FIG. 8A is a character pixel before the adjustment of aspect ratio. After the font of the character pixel is determined, all the character pixels in the character group which the character pixel 810 belongs to are adjusted according to an aspect ratio set from the font. As shown in FIG. 8B, a character pixel 820 after the adjustment of aspect ratio seems more neat and natural than the character pixel 810 before the adjustment. Thereby, the accuracy of the business card recognition is enhanced.

However, it is not necessary to adjust the character aspect ratio whenever correcting the font. If the character pixels in the business card image are somewhat oblique, after the font of the characters in the business card image is corrected through rotation, the business card recognition system may still successfully recognize the information in the business card image without adjusting the character aspect ratio. Therefore, in this embodiment, before the step of adjusting the character aspect ratio, it is further determined whether the included angle formed between the first axis and the second axis in each character group is larger than a predetermined angle. When the included angle is larger than the predetermined angle, the length and width of the character group is adjusted according to the character aspect ratio, and a corrected business card image is generated.

Figure 9:
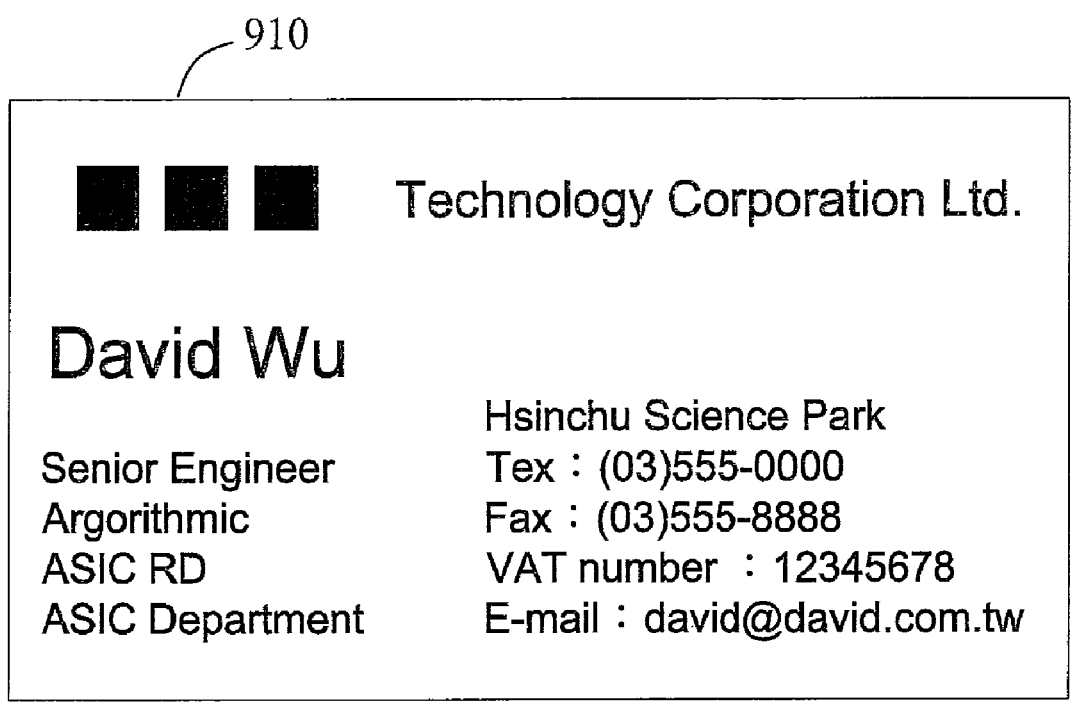
FIG. 9 is a schematic view of a business card image after processing according to a preferred embodiment of the present invention.

FIG. 9 is a schematic view of a business card image after processing according to a preferred embodiment of the present invention. Referring to FIG. 9, after adjusting the aspect ratio of the character pixels, a plurality of character groups is integrated to generate a business card image 910 after processing. In some embodiments, the length and width of the business card image 910 after processing are further adjusted according to a predetermined aspect ratio of the business card, so as to standardize the size of the business card image.

What is claimed is:

1. A method for automatically rectifying a business card presentation angle, applicable to a mobile electronic device, so as to automatically rectify the presentation angle of a business card image, the method comprising:
   maintaining a plurality of character pixels in the business card image;
   taking out a plurality of character groups from the character pixels, wherein the taking out step comprises:
      calculating a pitch between any two adjacent character pixels;
      when the pitch is smaller than a predetermined distance, arranging the adjacent character pixels into the same character group; and
      when the pitch is larger than the predetermined distance, arranging the adjacent character pixels into different character groups;
   circumscribing the character groups with a border-defining block, and drawing a first axis according to the positions of character pixels that are horizontally arranged side by side in the character groups, wherein the first axis is parallel to one side of the border-defining block;
   drawing a second axis according to the position of a first character pixel in each row of the character pixels in the character groups, wherein the second axis is parallel to another side of the border-defining block, and an included angle formed by the first axis and the second axis is not equal to 90° or 180°;
   calculating the included angle formed between the first axis and the second axis corresponding to the character groups, and adjusting the character groups according to the included angle; and
   when the included angle is larger than a predetermined angle, adjusting the length and width of the character groups according to a character aspect ratio, and generating a corrected business card image.

2. The method for automatically rectifying a business card presentation angle as claimed in claim 1, wherein the character pixels are pixels in the business card image with a brightness greater than that of a predetermined image.

3. The method for automatically rectifying a business card presentation angle as claimed in claim 1, wherein the range of the border-defining block is set to be the range of each column of the character pixels in the character groups plus a line-height.

4. The method for automatically rectifying a business card presentation angle as claimed in claim 1, wherein the step of adjusting the character groups according to the included angle comprises:
   rotating the character groups, to make the second axis of the character groups horizontal;
   calculating the included angle formed between the first axis and the second axis of the character groups;
   calculating a rotation angle corresponding to the included angle; and
   rectifying the obliqueness of the corresponding character group according to the rotation angle, so as to make the first axis perpendicular to the second axis of the character group.

5. The method for automatically rectifying a business card presentation angle as claimed in claim 1, further comprising determining the font according to one of the character pixels, and setting the character aspect ratio according to the font.

6. The method for automatically rectifying a business card presentation angle as claimed in claim 1, further comprising adjusting the length and width of the corrected business card image according to a predetermined business card aspect ratio.

7. The method for automatically rectifying a business card presentation angle as claimed in claim 1, wherein the boarder-defining block is a polygon.

8. The method for automatically rectifying a business card presentation angle as claimed in claim 7, wherein the first axis is parallel to one side of the polygon, and the second axis is parallel to another side of the polygon.

9. A method for automatically rectifying a business card presentation angle, comprising the steps of:
   (a) generating a business card image by electronically photographing a business card;
   (b) extracting character pixels from the business card image;
   (c) grouping the character pixels into a plurality of character groups, the step (c) including
      calculating a pitch between any two adjacent character pixels,
      arranging the adjacent character pixels into a same character group if the pitch calculated is smaller than a predetermined distance, and
      arranging the adjacent character pixels into different character groups if the pitch is larger than a predetermined distance;
   (d) establishing a border around one of the character groups, the border around each character group having first and second straight segments;
   (e) establishing a first axis for said one of the character groups, the first axis being parallel to the first straight segment of the border;
   (f) establishing a second axis for said one of the character groups, the second axis being parallel to the second straight segment of the border, and an included angle formed by the first axis and the second axis is not equal to 90° or 180°;
   (g) calculating the included angle between the first and second axis;
   (h) adjusting the first one of the character groups according to the angle; and
   (i) repeating steps (d)-(h) for at least one further character group.

10. The method for automatically rectifying a business card presentation angle according to claim 9, wherein if the angle for said first one of the character groups is larger than the predetermined angle, the method further comprises the step of adjusting the length and width of the first one of the character groups according to a character aspect ratio.

11. The method for automatically rectifying a business card presentation angle according to claim 9, further comprising the step of rotating said first one of the character groups to make the second axis horizontal.

* * * * *